United States Patent [19]

Wada et al.

[11] Patent Number: 4,863,706

[45] Date of Patent: Sep. 5, 1989

[54] PROCESS FOR PRODUCING ZIRCONIUM SOLS AND GELS, AND PROCESS FOR PRODUCING ZIRCONIA USING THE SAME

[75] Inventors: Takeo Wada, Kawanishi; Hiroshi Onaka, Nagaokakyo; Hideaki Matsuda, Nishinomiya, all of Japan

[73] Assignee: Takeda Chemical Industries, Ltd., Osaka, Japan

[21] Appl. No.: 118,940

[22] Filed: Nov. 10, 1987

Related U.S. Application Data

[62] Division of Ser. No. 947,417, Dec. 24, 1986, Pat. No. 4,731,234.

[30] Foreign Application Priority Data

Dec. 25, 1985 [JP] Japan .............................. 60-294792

[51] Int. Cl.$^4$ ............................................. C01B 35/06
[52] U.S. Cl. .................................... 423/277; 423/279; 423/280; 423/288; 423/292; 423/462; 423/463; 423/472; 423/492; 423/593
[58] Field of Search ............... 423/277, 292, 279, 280, 423/276, 288, 472, 463, 462, 492, 593

[56] References Cited

U.S. PATENT DOCUMENTS

| | | | |
|---|---|---|---|
| 3,423,193 | 1/1969 | Stynes | 423/288 |
| 3,928,545 | 12/1975 | Jones et al. | 423/463 |
| 4,036,655 | 7/1977 | Yamada et al. | 106/287.1 |
| 4,189,405 | 2/1980 | Knapton et al. | 502/178 |
| 4,238,464 | 12/1980 | Gustafson | 423/279 |
| 4,320,074 | 3/1982 | Birchall et al. | 501/127 |
| 4,323,381 | 4/1982 | Matsuyama et al. | 423/338 |
| 4,731,234 | 3/1988 | Wada et al. | 423/277 |

*Primary Examiner*—Anthony McFarlane
*Attorney, Agent, or Firm*—Wenderoth, Lind & Ponack

[57] ABSTRACT

A process for producing acidic boratozirconium chloride sols which comprises: reacting a zirconium compound with a boron compound in molar ratios of B/Zr of 0.3–1.2 together with a compound of a metal M, the metal M being selected from the group consisting of divalent, trivalent, tetravalent and pentavalent metals in molar ratios of M/Zr of about 0.01–1 in water in the presence of chloride ions in molar ratios of Cl/Zr of not less than about 1.

The acidic boratozirconium chloride sol may be converted to basic boratozirconium sols by reacting the acidic sol with a basic carbonate compound such as ammonium carbonate.

The sols, either acidic or basic, are readily gelled by contact with a dehydration solvent such as methanol or acetone.

The gel is calcined at relatively low temperatures to provide zirconia which is either very pure or stabilized in varied degrees.

3 Claims, 5 Drawing Sheets

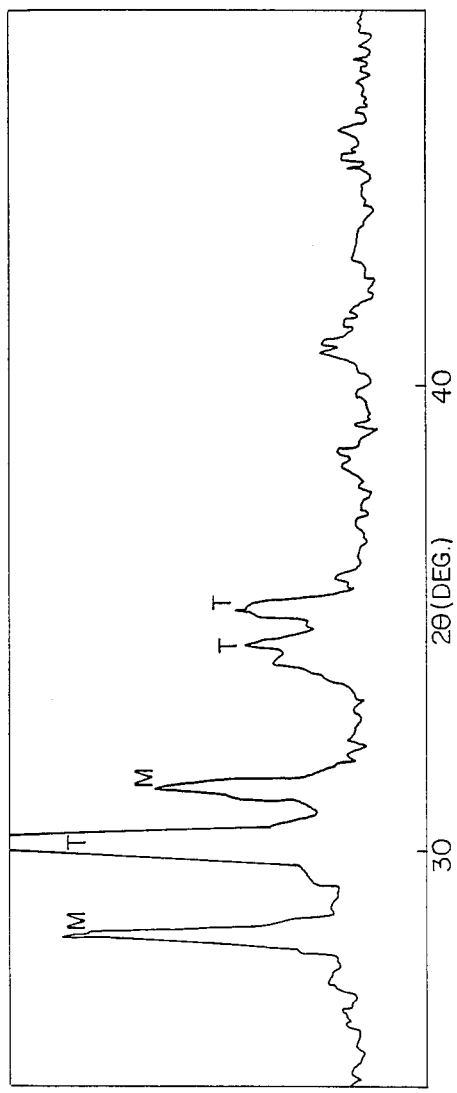
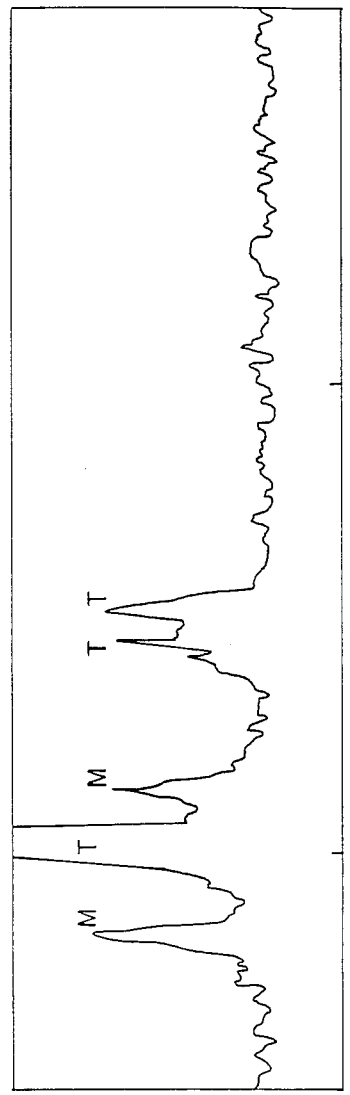

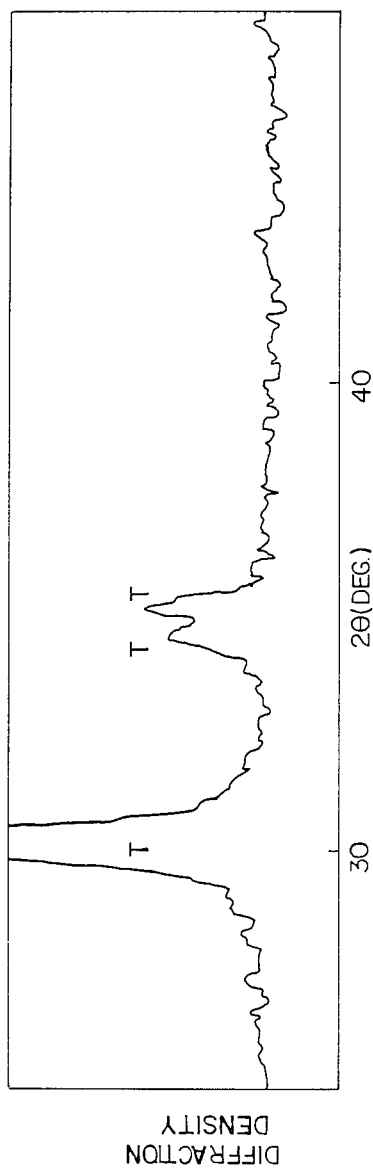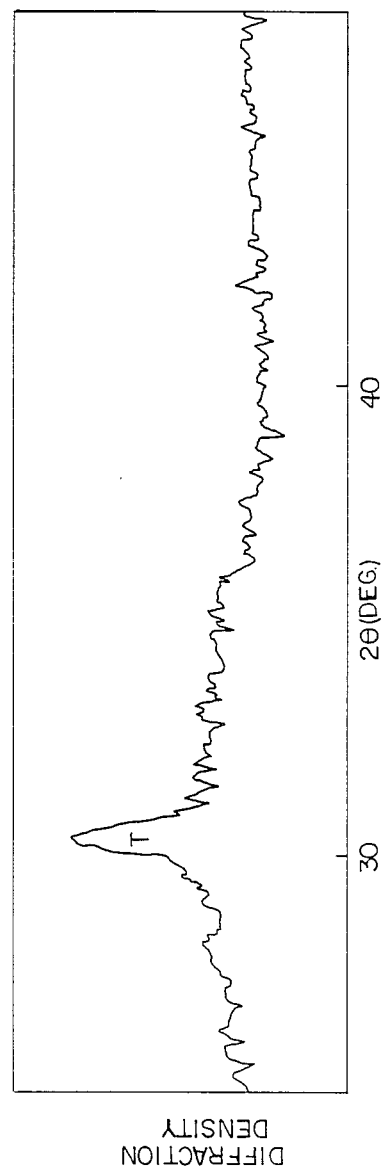

PROCESS FOR PRODUCING ZIRCONIUM SOLS AND GELS, AND PROCESS FOR PRODUCING ZIRCONIA USING THE SAME

This is a Rule 60 division of Ser. No. 947,417, filed Dec. 24, 1986, now U.S. Pat. No. 4,731,234.

BACKGROUND OF THE INVENTION

This invention relates to a process for producing zirconium sols and gels, and a process for producing zirconia using such sols and gels.

As disclosed in U.S. Pat. No. 3,423,193, it is already known that the reaction in water of zirconyl chloride and boric acid in the presence of hydrochloric acid produces, as water-soluble precipitates, boratozirconium chloride containing both boron and chlorine in amounts equimolar to zirconium, respectively, and having the formula $(HBO_3)(ZrOH)Cl \cdot xH_2O$. It is also disclosed that the boratozirconium chloride forms an acidic viscous sol solution when being dissolved in water, and the sol forms gels when being mixed with organic solvents such as methanol or ethanol. However, since the above reaction is carried out in very stong acidic conditions due to a strong acidity of zirconyl chloride, the reaction is unsuitable for industrial production of boratozirconium chloride sol.

On the other hand, the use of zirconium oxide or zirconia is now rapidly expanding. For example, pure zirconia is used as piezoelectric materials; stabilized zirconia is used as oxygen sensors; and partially stabilized zirconia is used as structural materials such as engine parts as well as industrial tools and blades.

As is well known, when being heated, zirconia changes its crystallographic form from monoclinic to tetragonal form at about 1000° C., and changes from tetragonal to cubic form at about 1400° C. When being cooled, there takes place the reverse transformation in turn, and the transformation of zirconia from tetragonal form to monoclinic is accompanied by a large expansion of volume. Therefore, stabilized or partially stabilized zirconia which contains such metals as Y, Mg or Ca as stabilizers so as to form thermally stable solid solutions is widely used for the production of sintered molds of zirconia. The stabilized zirconia has the tetragonal form over a wide range of temperatures, while the partially stabilized zirconia has the tetragonal form together with monoclinic.

Various methods are already known for the production of stabilized or partially stabilized zirconia, and the representative methods are powder-mixing method and coprecipitating method. In order to produce zirconia which contains yttrium therein by the powder-mixing method, for example, a powder of zirconium oxide and a powder of yttrium oxide are mixed together in a predetermined ratio, and the powder mixture is heated at a high temperature. This reaction is a solid reaction which needs high temperatures more than about 1300° C., and thus the resultant zirconia is unavoidably deficient in uniformity of compositions. According to the coprecipitating method, an aqueous solution which contains both of a zirconium salt such as zirconyl chloride and an yttrium salt such as yttrium chloride, for example, is first prepared, and a common precipitant such as ammonia is added to the solution to coprecipitate zirconium hydroxide and yttrium hydroxide, followed by calcination of the coprecipitate at about 1000° C., to provide stabilized or partially stabilized zirconia depending upon the amount of yttrium used. However, since the coprecipitate is not fixed in compositions, the resultant zirconia is also deficient in uniformity of composition.

A further method is also known in which alcoholates of zirconium and yttrium, for example are concurrently hydrolyzed to form coprecipitates of hydroxides, followed by calcination of the coprecipitate, but this method also fails to provide zirconia having a fixed composition, similarly to the coprecipitating method.

As described as above, it is difficult to produce zirconia which is fixed and uniform in composition by the prior methods, and furthermore, all of the prior methods require complicated procedures resulting in high costs for the production of zirconia.

BRIEF SUMMARY OF INVENTION

An object of the invention is, therefore, to provide a process for producing acidic boratozirconium chloride sols under mild reaction conditions.

An important object of the invention is to provide novel acidic boratozirconium chloride sols which contain metal species other than boron, and a process for producing such sols.

A further object of the invention is to provide novel basic boratozirconium sols which may contain metal species other than boron, and a process for producing such sols.

A specific object of the invention is to provide boratozirconium ammonium carbonate sols which may contain metal species other than boron, and a process for producing such sols.

It is also a specific object of the invention to provide acidic boratozirconium chloride gels which may contain metal species, and basic zirconium gels which may or may not contain boron and metal species other than boron, and further a process for producing such gels.

A still further object of the invention is to provide zirconium ammonium carbonate gels which may or may not contain boron and metal species other than boron, and a process for producing such gels.

An even further object of the invention is to provide a process for producing zirconia which is either pure or stabilized to varied degrees by use of such sols or gels as above.

Other features and objects of the invention will be apparent from the following description and accompanying drawings.

DRAWINGS

Figure 4:
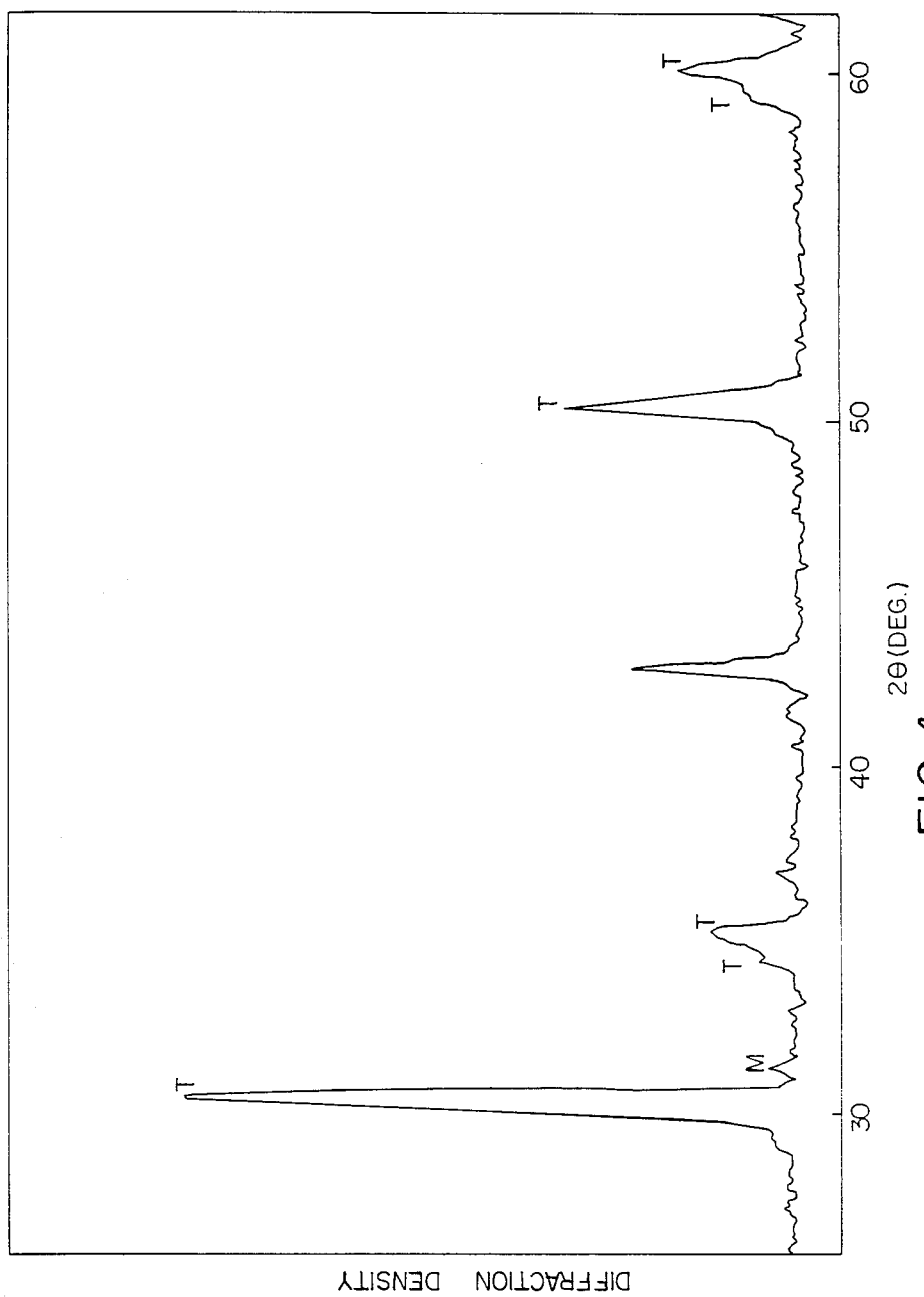

FIGS. 3A–D are x-ray diffraction diagrams of the gel of the invention calcined at varied temperatures to illustrate change of crytallographic structures; and FIG. 4 is an X-ray diffraction diagram of a stabilized zirconia obtained by calcining a gel containing Y and Mg therein at 1200° C.

DETAILED DESCRIPTION OF INVENTION

Acidic Boratozirconium Chloride Sols

According to the first process for producing acidic boratozirconium chloride sols, at least one zirconyl compound selected from the group consisting of zirconyl carbonate, zirconyl sulfate, zirconyl nitrate, zirconyl hydroxide, basic zirconyl chloride and zirconyl organic carboxylate is reacted with a boron compound in molar ratios of B/Zr of about 0.3-1.2 in the presence of chloride ions. That is, since the process uses no zirconyl chloride which is strongly acidic, the reaction can be carried out under milder conditions than the reaction where zirconyl chloride is used. Among the zirconyl compounds as specified above, zirconyl carbonate, zirconyl organic carboxylates such as zirconyl acetate, zirconyl hydroxide or a mixture of two or more of these are preferably used.

According to the second process for producing acidic boratozirconium chloride sols, a zirconium compound is reacted with a boron compound in molar ratios of B/Zr of about 0.3-1.2 together with a compound of a metal M, the metal M being selected from the group consisting of divalent, trivalent, tetravalent and pentavalent metals, in molar ratios of M/Zr of about 0.01-1 in water in the presence of chloride ions in molar ratios of Cl/Zr of not less than about 1, thereby to provide acidic boratozirconium chloride sols which contain the metal species.

For example, a zirconium compound is dissolved in a sufficient amount of hydrochloric acid, and then a boron compound and a compound of the metal M are added to the solution of the zirconium compound to dissolve therein and the mixture is stirred until it becomes a uniform solution. As another method, the zirconium compound is mixed together with the boron compound and the compound of the metal M, and the mixture is dissolved in hydrochloric acid with stirring.

The acidic boratozirconium chloride sol thus obtained is a sol of zirconium oxide hydrates containing the metal M species as well as boron. Various sols and gels described hereinafter also may contain the metal species. However, the state of the metal species in the sol is not yet clear, and therefore the term, metal species, herein the specification means the state as well as the kind of the metal in the sol or gel.

In the first and second process of the invention, boric acid or borax is preferably used, and boric acid is most preferred as the boron compound, although not limited thereto. The boron compound may be used in excess to the zirconium compound. But the amount of boron over the equivalent to zirconium is present in the mixture without participating in the formation of sols, so that the boron compound is reacted with the zirconium compound usually in molar ratios of B/Zr of about 0.3-1.2, preferably in molar ratios of about 0.5-1.0. The amount of water used is dependent on the concentration of the sol desired, but usually is not less than about 30% by weight based on the weight of the sol.

The chloride ion is indispensable in the sol formation reaction of the invention, and must be present in the reaction system in amounts not less than about equivalent to zirconium, i.e, in molar ratios of Cl/Zr not less than about 1. When the chloride ion is absent in the reaction system, a zirconium compound and boric acid form water-insoluble salts, and no sol solution is formed. Hydrochloric acid is preferably used as the source of the chloride ion.

The chloride ion may be partially or totally displaced by other halogen ions, such as bromide or iodide ions. Therefore, acidic boratozirconium bromide sols and boratozirconium iodide sols are similarly obtainable by use of bromide ions and iodide ions, respectively. These halide ions may be supplied by such zirconium compounds as zirconyl bromide or zirconyl iodide, or hydrogen bromide or hydrogen iodide.

In the second process, any zirconium compound is usable which is soluble in hydrochloric acid, and the zirconium compound includes zirconyl carbonate, zirconyl sulfate, zirconyl nitrate, zirconyl hydroxide, basic zirconyl chloride, zirconyl organic carboxylate and zirconyl chloride. A mixture of two or more of these is also usable. Among these zirconium compounds, zirconyl carbonate, zirconyl organic carboxylates such as zirconyl acetate, zirconyl hydroxide or a mixture of two or more of these are preferably used, and zirconyl carbonate is most preferable.

As described hereinbefore, the sol formation needs chloride ions in amounts of less than equivalent to zirconium in the reaction system. Also in the second process of the invention, hydrochloric acid is preferably used as the source of the chloride ion, but zirconyl chloride is usable as the source of the chloride ion in place of hydrochloric acid. Namely, zirconyl chloride acts both as the source of the chloride ion as well as a reactant.

The compound of the metal M used in the invention to form the acidic boratozirconium chloride sol which contains a metal species is a compound of a metal M which is either divalent, trivalent, tetravalent or pentavalent. By way of example, the divalent metal is Mg, Ca, Ba, Sr, Pb, Ni, Cu, Mn or Zn; the trivalent metal is Y, Al, Fe, Ga, In, Bi, Ce or La; the tetravalent metal is Ti, Sn, Si, Ge, Mn or Te; and the pentavalent metal is V, Mo, Sb or W. It is to be understood, however, when a metal M has two or more oxidation numbers as in the case of Mn, for example, the oxidation number of the metal M is not limited to the above exemplified, but such compounds of the metal as have an oxidation number other than the above specified are also usable as compounds of the metal M.

The metal compound is used preferably in the form of water-soluble salts such as halides, e.g., chlorides, bromides and iodides, or nitrates, carbonates or sulfates in the sol formation reaction in such amounts that the molar ratio of M/Zr is about 0.01-1. However, if necessary, the metal compound may be used as hydroxides or oxides.

The metal species may be in the form of hydroxides or oxide hydrates in the sol, and after the sol has been gelled, the metal species remain in the gel without separating from the gel.

The compound of the divalent metal includes halides such as magnesium chloride, magnesium fluoride, magnesium iodide, calcium chloride, calcium carbonate, calcium hydrogen carbonate, calcium sulfate, calcium nitrate, strontium chloride, strontium fluoride, strontium iodide, barium chloride, lead chloride and manganese chloride; the compound of the trivalent metal includes aluminum chloride, aluminum nitrate, aluminum sulfate, ferric chloride, yttrium trichloride, indium trichloride, bismuth trichloride, bismuth nitrate, cerium chloride and lanthanum chloride; the compound of the tetravalent metal includes germanium chloride, tellurium chloride, stannic chloride, titanium chloride and water glass; the compound of the pentavalent metal includes vanadyl sulfate, ammonium vanadate, sodium vanadate, ammonium tungstate or antimony chloride.

The sol formation reaction is carried out in water. Although the zirconium compound and boric acid which are preferably used in the invention are usually solid, it is preferred that the zirconium compound and boric acid are mixed with small amounts of water in the presence of chloride ions and kneaded to provide a paste-like or a solid-like reaction product, and then by adding water to the product, and when desired, heating. However, the sol formation reaction may be carried out by dissolving the zirconium compound and boric acid in large amounts of water and stirred in the presence of chloride ions. The reaction is carried out usually at temperatures from room temperature to about 100° C., and preferably at temperatures not less than about 50° C. If necessary, the reaction may be carried out at temperatures more than about 100° C. under an increased pressure.

The acidic boratozirconium chloride sol thus obtained in the invention is transparent and relatively viscous, and usually has a pH not less than bout 5. The amount of zirconium in the sol is usually controlled to be not more than about 15% by weight, and preferably not more than about 10% by weight from a viewpoint of easy handling of the sol.

Basic Boratozirconium Sols

The aforesaid acidic boratozirconium chloride sol is strongly acidic, so that it may be inaplicable to some uses. For example, when the acidic sol is used in conjunction with a latex, the sol causes coagulation of the latex because of the strong acidity of the acidic sol. However, a basic sol which can be converted from the acidic sol causes no coagulation of a latex, so that the basic sol may be usable together with a latex.

According to the invention, the acidic boratozirconium chloride sol is converted to basic boratozirconium sols by adding a basic carbonate compound of a monovalent cation to the acidic sol in such amounts that the molar ratio of the monovalent cation such as ammonium or alkali metal ion to zirconium is not less than about 2, and stirring.

The carbonate of monovalent cation is preferably a basic carbonate compound, which may be, for example, ammonium carbonate, lithium carbonate, ammonium hydrogen carbonate, sodium carbonate and potassium carbonate. For instance, the reaction of the acidic boratozirconium chloride sol and ammonium carbonate produces basic borato-zrconium ammonium carbonate sols.

In the production of the basic boratozirconium sol, the basic carbonate compound may be added as aqueous solutions to the acidic sol solution, however, it is preferred that the carbonate is added as powders to the acidic sol solution gradually from simplicity of operations, since the acidic sol is converted to the basic sol via neutral gel-like substances. As a further method, a hydroxide such as ammonium hydroxide, sodium hydroxide or potassium hydroxide is in advance added to the acidic sol solution, and then carbon dioxide gas is blown into the sol to produce in situ the basic carbonate compound in the sol, thereby to produce the basic boratozirconium sol.

The basic carbonate compound is added to or in situ generated in the acidic sol solution in such amounts that the molar ratio of the monovalent cation such as ammonium or alkali metal ion to zirconium is not less than about 2, and usually in amounts large excess to zirconium in the acidic sol to stabilize the resultant basic sol. The excess amount of the monovalent cation is present as water-soluble carbonates in the basic sol.

The reaction to convert the acidic sol to the basic sol is usually carried out at temperatures of from room temperatures to about 100° C. The reaction mixture is preferably heated to accelerate the conversion.

Gellation of Acidic Boratozirconium Chloride Sols

According to the invention, the acidic boratozirconium chloride sol can be readily gelled by contact dehydration, namely by bringing the sol into contact with the dehydration solvent. The dehydration solvent is an organic solvent, and preferred ones include, for example, a dialkyl ketone wherein the each alkyl has -3 carbons, a lower aliphatic alcohol having 1-5 carbons, or a mixture of these. In particular, acetone, methyl ethyl ketone, diethyl ketone, methanol, ethanol, isopropanol, n-butanol and isobutanol are preferred.

It is already known that a water-soluble sol is gelled by adjusting the pH of the sol to form a hydrogel, and then by drying the hydrogel to a xerogel. However, according to the invention, the acidic boratozirconium chloride sol is immediately converted to a xerogel which contains only a small amount of water therein by putting the sol into contact with the organic solvent as above. Depending the composition of the sol, when methanol or ethanol, for example, is used as the dehydration solvent, the acidic boratozirconium chloride sol forms a hydrogel by the contact therewith, and the hydrogel is then put into contact with ethyl acetate, for example, so that the hydrogel is readily dehydrated to a xerogel.

Further according to the inventin, the acidic boratozirconium chloride gel in a variety of forms are obtainable by selecting the manner in which the sol is put into contact with the dehydration solvent, the stirring rate and manner of the dehydration solvent to which the sol is added, etc. For example, the addition of the acidic sol to a stirred dehydration solvent usually provides gels in the form of short fibers. The injection of the acidic sol from a nozzle into a dehydration solvent usually provides gels in the form of long fibers. When the sol is placed in a vessel having many perforations thereon and the sol is added to a dehydration solvent from the perforations while the vessel is turned, then gels in th form of fibers having an intermediate length is obtained. Moreover, since the gel thus obtained is soft and elastic, the gel can be filtered on a screen or a filter to provide gels in the form of sheets or mats. The gel in the form of sheets or mats may also be obtained by bringing the acidic sol into contact with a dehydration solvent at the interface between the sol and the solvent. The gel in the form of powders can be produced by adding the acidic sol dropwise to a dehydration solvent.

The resultant gel can be filtered and dried while retaining the forms, and further the gel still retains the form after calcination at high temperatures. Therefore, zirconia in various forms, such as fibers, sheets, mats of powders, can be obtained according to the gellation of the acidic boratozirconium chloride sol of the invention.

Further according to the invention, very fine powders of gels are obtained by putting the acidic boratozirconium chloride sol into contact with a dehydration solvent, preferably the aliphatic alcohol beforementioned, under vigorous stirring which contains alkalis such as hydroxides, for example, ammonium hydroxide, lithium hydroxide, sodium hydroxide and potassium hydroxide, or alcoholates of metals, for example, such as magnesium, aluminium, zirconium, titanium, antimony or zinc. In particular, ammonium hydroxide is preferably used as the alkali since this method readily provides very fine powders of gels, which are in turn readily calcined to provide very fine powders of zirconia.

The acidic boratozirconium chloride sol may be put into contact with a dehydration solvent at temperatures not more than the boiling temperatues of the dehydration solvent.

The acidic boratozirconium chloride gel thus obtained is usually xerogels which retain the initial composition, however, the gel returns to the same sol as the initial sol when the gel is added to water and stirred. Therefore, the acidic boratozirconium chloride gel is usable as a material for producing the acidic boratozirconium chloride sol.

Gellation of Basic Zirconium Sols

The basic boratozirconium sol which ,ay or may not contain therein the metal species is readily and immediately gelled to form precipitates by being put into contact with the aforesaid dehydration solvent, and the precipitate readily provides very fine powders of gels of about 0.01-1 μm in particle size after separation, for example, by filtration or centrifugal separation and then drying.

The basic boratozirconium gel also returns to basic boratozirconium sols when the gel is added to water and stirred. Specifically, when the gel is added to alkaline water in such a manner that the mixture contains zirconium in amounts not more than about 15% by weight, to provide a stable basic sol. The basic sol thus obtained has usually a pH of 9.5-11.8. For instance, the sol has a pH of 10.4 when the gel contains zirconium in amounts of 4% by weight.

Boratozirconium Ammonium Carbonate Sols and Zirconium-ammonium Carbonate Gels

Zirconium ammonium carbonate sols, as one of the basic zirconium sol, are already known and available on the market. The zirconium ammonium carbonate sol is, as is known, produced by reacting zirconyl carbonate with a basic carbonate compound such as ammonium carbonate or ammonium hydrogen carbonate to form a paste, and then by heating the paste. Usually, water is added to the paste to adjust the concentration of the sol. In this reaction, the basic carbonate compound is used in such amounts that the molar ratio of the ammonium ion to zirconium is not less than about 2, and preferably is large excess to zirconium so that the resultant sol is stable. The excess amount of the basic carbonate compound which remains unreacted forms water-soluble carbonates and remains in the sol. Further, the basic carbonate compound is used in the reaction preferably in the form of powders, although the compound may be used as aqueous solutions.

According to the process of the invention, the boratozirconium ammonium carbonate sol is obtained by adding boric acid or ammonium borate to the zirconium ammonium carbonate sol and then stirring the mixture. In this reaction also, boric acid or ammonium borate is used in such amounts that the B/Zr molar ratio is about 0.3-1.2, preferably about 0.5-1.0.

Boratozirconium ammonium carbonate sols which contain the metal M species as described hereinbefore are also obtainable by adding boric acid or ammonium borate together with a compound of the divalent, trivalent, tetravalent or pentavalent metal M to the zirconium ammonium carbonate sol and then by stirring the mixtue. In this reaction also, the compound of te metal M is used in such amounts that the molar ratio of M/Zr is about 0.01-1. The reaction is carried out usually at temperatures from room temperatures to about 100° C., and preferably under heating to accelerate the reaction.

When the boratozirconium ammonium carbonate sol is put into contact with the dehydration solvent containing the compound of the metal M dissolved therein, gels which contain the metal species as well as boron are obtained.

As an important aspect of the invention in connection with the above zirconium ammonium carbonate sol, the zirconium ammonium carbonate gel which contains the metal species are readily obtainable by putting the sol into contact with lower aliphatic alcohols of 1-4 carbons or dialkyl ketones wherein the each alkyl has 1-4 carbons as the dehydration solvent which contains the metal species as the compound of the metal, and further the gel is readily calcined to zirconia containing the metal species. Particularly methanol or acetone is most preferred since the compound of the metal M usually has a large solubility therein. For example, the contact of the zirconium ammonium carbonate sol with the dehydration solvent which contains the compound of the metal M dissolved therein produces gels which retain the metal species. When the dehydration solvent contains a boron compound, for example, such as boric acid, ammonium borate or borax, as well as the compound of the metal M species, there result gels which retain boron and the metal M species, e.g., boratozirconium ammonium carbonate gels containing the metal M species result.

All of these gels, similarly to the acidic and basic zirconium sols and gels described hereinbefore, are readily converted by calcination to zirconia containing the oxide of the metal M, and boron when contained in the gel.

Stepwise Incorporation of Metal Species into Sols and Gels

According to the process of the invention, sols and gels which contain the metal species may also be obtained by stepwise incorporation of the metal species into sols and gels.

For example, an acidic boratozirconium chloride sol is first so prepared that it contains the first metal species or first impure metal elements, such as Y, Fe, Al, Ga, In, Ti, Si, Sn, Ge, V, Te, Sb, Bi, Mo and/or W by reacting a zirconium compound with compounds of the metal in the presence of chloride ions, and then this acidic sol is put into contact with the dehydration solvent, such as acetone, methanol, ethanol, n-propanol, isopropanol, n-butanol or isobutanol which contains compounds of the second metals or second impure metal elements other than the first metal, such as Mg, Ca, Zb, Ni, Ba, Sr, Fe, Cu or Mn, thereby to produce acidic boratozirconium chloride gels which contain the metal species as above as impure metal elements. The dehydration solvent may also contain Al, when needed.

It is preferred that the molar ratio of the total of boron and the first metal L species to zirconium, i.e., (B+L)/Zr is about 0.3-1.2, and most preferably the ratio is about 0.5-1.0, whereas the ratio of the second metal R species to zirconium, i.e., the molar ratio R/Zr is preferably not more than about 15 mole%, and most preferably the ratio is not more than about 10 mole%. However, these ratios are not specifically limited, but may principally be selected in accordance with desired requirements, properties, etc. of resultant sols or gels, and uses thereof.

When an acidic boratozirconium chloride sol which contains no metal species are specified before is put into contact with the dehydration solvent, preferably acetone or metanol, which contains the second metal species, acidic boratozirconium chloride sols which contain the second metal species therein are obtained.

Further by way of example, an acidic boratozirconium chloride sol which contains the first metal species, such as Y, Fe, Al, Ga, In, Ti, Si, Sn, Ge, V, Te, Sb, Bi, Mo and/or W, and preferably Y, Al, Ga, In, Ti or Si, may be first converted to a basic zirconium sol, for instance, to basic boratozirconium ammonium carbonate sols, and then the basic sol is put into contact with the dehydration solvent containing compounds of the second metal, thereby to produce the basic boratozirconium ammonium carbonate sols which contain both the first and second metal species.

In a similar way, an acidic boratozirconium chloride sol which contains no metal species as specified before is converted to a basic boratozirconium sol, and then the basic sol is put into contact with the dehydration solvent containing compounds of the second metal, thereby to produce the basic boratozirconium ammonium carbonate sol which contains the second metal species.

The above process provides gels suitable for the production of stabilized or partially stablized zirconia. As a representative example, an acidic or basic boratozirconium chloride sol containing yttrium therein is first prepared, and the sol is then put into contact with a dehydration solvent containing compounds of Mg, Ca and/or Zn dissolved therein, thereby to provide a gel which contains Mg, Ca and/or Zn as well as yttrium. These gels readily yield stabilized or partially stabilized zirconia by calcination at elevated temperatures. Lower aliphatic alcohols such as methanol, ethanol or isopropanol are most preferred as the dehydration solvent since the compounds of the metal as above are readily dissolved in these solvents. However, acetone may also be used, in which, for example, stearic acid salts of magnesium, calcium or zinc, or magnesium alcoholate may be dissolved as the compound of the metal, if necessary in place of compounds in the form of salts as described before.

The dehydration solvent may contain other organic solvents, metal salts, water-soluble resins, surfactants, etc. as additives in order that the resultant gels have additional or desired properties such as plasticity, moldability or water-repulsion. The gel formation reaction is not influenced by these additives. The additive includes, for example, mono- and polyhydric compounds such as ethylene glycol, diethylene glycol, glycerine, polyethylene glycol, hydroxy-carboxylic acids such as gluconic acid or lactic acid, and further hydroxymethylcelluloses, ethylcelluloses, polyvinyl alcohols, polyvinyl acetates, alcohol-modified silane coupling agents, and various surfactants.

Compositions of Gels

Figure 1:
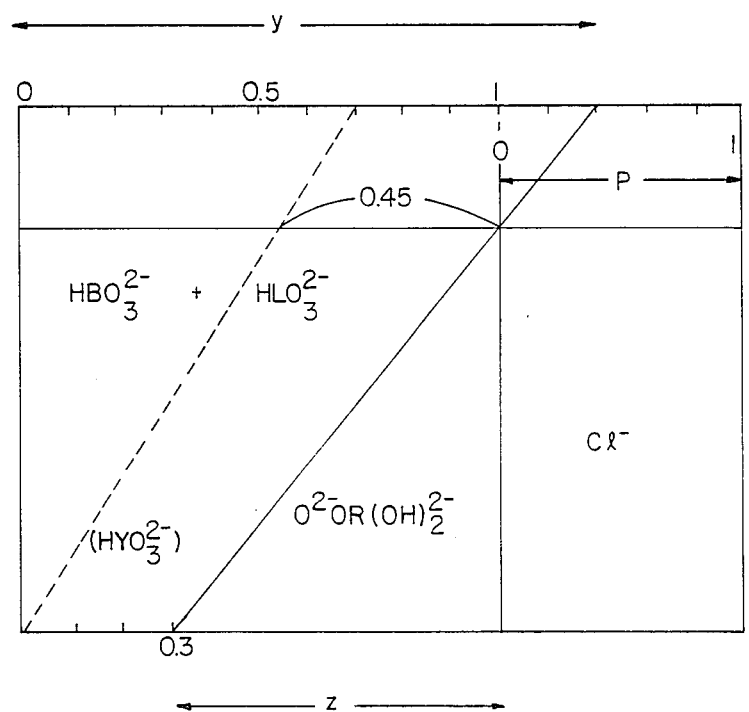
FIG. 1 is a graph showing compositions of acidic boratozirconium chloride gels of the invention.

The acidic boratozirconium chloride gel of the invention has the general formula of $ZrOH[(HBO_3)_x(HLO_3)_{1-x}]_y(O \text{ or } (OH)_2)_zCl_p \cdot nH_2O$, as shown in FIG. 1, wherein L represents the first element, for example, yttrium, and $0 < x \leq 1$; and $z=0$ and $p=3-2y$ when $1 \leq y \leq 1.2$; and $z=1-y$ and $p=1$ when $0.3 \leq y \leq 1$; and n is usually 2-8.

Therefore, when the gel contains no impure metal element and B/Zr is adjusted to 1 in the aforesaid process, the resultant acidic boratozirconium sol has the formula of $ZrOH(HBO_3)Cl \cdot nH_2O$. When the gel contains an impure element L as partial substituents of boron, and (B+L)/Zr is adjusted to 1, then the gel has in principle the formula of $ZrOH[(HBO_3)_x(HLO_3)_{1-x}]Cl \cdot nH_2O$, wherein the value of x depends on the element L. For instance, when the element L is yttrium, then the value x is about 0.45 at the maximum, as shown by a dotted line in FIG. 1. However, when the element is aluminum, it can displace all of the boron. The ion components $(HBO_3)^{2-}$ and $(HLO_3)^{2-}$ may be in part displaced by $O^{2-}$ or $(OH_2)_2^{2-}$ in some cases.

However, as described hereinbefore, the molar ratio of B/Zr can be 1.2 at the maximum, and in this case the gel will have the formula of $ZrOH(HBO_3)_{1.2LK}Cl_{0.6} \cdot nH_2O)$, as shown in FIG. 1. When the gel contains yttrium as an impure element in place of boron in part, then the gel has the formula of $ZrOH(HBO_3)_{0.7}(HYO_3)_{0.5}Cl_{0.6} \cdot nH_2O$, provided that boron has been displaced by yttrium to the maximum.

On the other hand, the molar ratio of B/Zr may be 0.3 at the minimum, and in this case it is likely that the ion components $(HBO_3)^{2-}$ and $(HLO_3)^{2-}$ are in part displaced by $O^{2-}$ of $(OH_2)_2^{2-}$, and hence the gel which contains no impure element has the formula of $ZrOH(HBO_3)_{0.3}(O \text{ or }(OH)_2)_{0.7}Cl \cdot nH_2O$. When the molar ratio (B+Y)/Zr is 0.3 and the amount of yttrium is a maximum, then the gel has the formula of $ZrOH[(HBO_3)_{0.01}(HYO_3)_{0.29}](O \text{ or } (OH)_2)_{0.7}Cl \cdot nH_2O$, in which, however, the amount of $O^{2-}$ and $(OH_2)_2^{2-}$ cannot be determined by chemical analysis.

Figure 2:
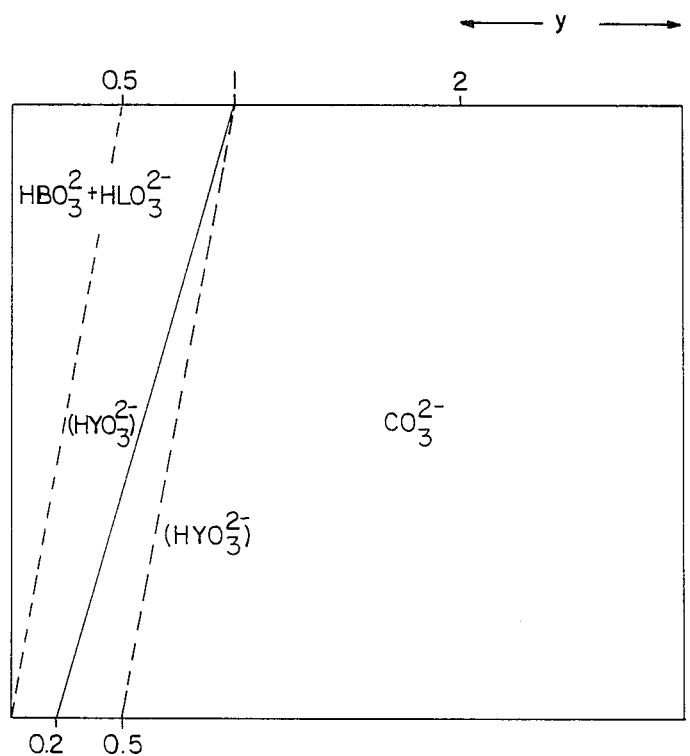
FIG. 2 is a graph showing compositions of basic boratozirconium ammonium carbonate gels of the invention.

The basic boratozirconium gel has the general formula as illustrated in FIG. 2. Namely, when Q is a monovalent cation such as ammonium ions, and the molar ratio (B+L)/Zr is 1, then the basic boratozirconium gel of the invention has in general the formula of $Q_{2+2y}ZrO[(HBO_3)_x(HLO_3)_{1-x}](CO_3)_{1+y} \cdot nH_2O$. Therefore, when the gel contains no impure element L therein, i.e., when x=1, then y ranges from 0 to about 0.7. Therefore, the principal gel which contains no impure element L therein and in which the molar ratio of B/Zr is 1 has the formula of $Q_{2+2y}ZrOH(HBO_3)(CO_3)_{1+y} \cdot nH_2O$. The basic gel in which boron is substituted with, for example yttrium, has x of about 0.5 at the maximum, and hence the formula is represented by $Z_{2+2y}ZrO[(HBO_3)_{0.5}(HYO_3)_{0.5}](CO_3)_{1+y} \cdot nH_2O$.

However, when the gel containing no impure element therein, parts of $(HBO_3)^{2-}$ can be displaced by $CO_3^{2-}$, and when the substitution takes place at the maximum, then the formula is represented by $Z_{2+2y}ZrO(HBO_3)_{0.2}(CO_3)_{1.8+y} \cdot nH_2O$. When the gel contains yttrium, then the gel contains small amounts of $HBO_3^{2-}$ therein and has the formula represented by $Q_{2+2y}ZrO(HYO_3)_{0.5}(CO_3)_{1.5+y} \cdot nH_2O$.

Production of Zirconia

According to the invention, the calcination of various gels as set forth hereinbefore at temperature not less than about 700° C., preferably not less than about 800° C., readily and inexpensively yields zirconias which are either highly pure or stabilized in varied degrees. As before described, gels in a variety of forms or shapes such as fibers or sheets as well as powders are obtained according to the invention, and such gels yield zirconias which retain substantially the same forms as those of gels. The calcination temperature is not specifically limited, provided that it is not more than the melting point of zirconium oxide, but it is usually up to 1700° C. from practical and economical points of view.

The amount of the first metal L such as yttrium and the amount of the second metal R such as magnesium in the gel are selected depending on needed properties and applied uses of the resultant zirconia. In general, however, the molar ratio (L+R)/Zr is so adjusted to be 1-10 mole% for the production of stabilized zirconia which has substantially only tetragonal form. However, the stabilized zirconia is also obtained by adjusting the molar ratio L/Zr to be 2-15 mole% while R/Zr to be 3-15 mole%. Meanwhile, the partially stabilized zirconia is obtained by controlling the molar ratio (L and/or R)/Zr to be about 1-5 mole%.

Both the acidic and the basic boratozirconium gels which are obtained according to the process of the invention contain boron in the form of boric acid ($B_2O_3$) which is known to be volatile. Therefore, during the calcination of the gel of the invention, the gel is at first dehydrated. When the gel is a basic boratozirconium ammonium carbonate gel, the gel is deammonianized while being dehydrated. Then the gel yields zirconia having a low degree of crystallinity of cubic and tetragonal forms at about 600° C., and then boric acid gradually sublimes at about 700°-900° C. to yield tetragonal zirconia through monoclinic, thereby to produce partially stabilized zirconia by X-ray diffraction studies when the gel contains the metal species such as Y and Mg.

When the zirconium gel, either acidic or basic, contains no metal species other than boron therein, the gel yields monoclinic zirconia by the calcination of the gel at temperatures of about 1200°-1400° C.

In the process of the invention, boric acid functions as a binder at about 600°-1000° C. during the calcination of the gel, and accordingly the gel in the forms of fibers or sheets yields zirconia which retains the same form as that of the gel. However, when very fine powder gels are calcined, there result very fine powders of zirconia since boric acid rapidly sublimes from the gel powder during the calcination. This makes it possible to produce very fine powers of stabilized or partially stabilized zirconia when gels contain the first and/or second metals therein.

Further according to the invention, porous zirconia is also obtainable by calcining the boratozirconium gel at temperatures of about 700°-1000° C., preferably at about 700°-800° C. so that boric acid gradually sublimes therefrom. On the other hand, the calcination of the gel at temperatures not less than about 800° C., preferably not less than about 1000° C., yields densely sintered zirconia.

As a further feature of the zirconia of the invention, since the zirconia of the invention contains boric acid therein, the zirconia itself is useful also as a binder in the sintering of other ceramic powders. The zirconia powder makes it possible to form a densely sintered molds of ceramics by sintering at temperatures as low as about 800° C.

As fully set forth as hereinbefore, the acidic and basic zirconium sols which contain a variety of metal species therein are readily obtained according to the invention. Such sols of the invention are readily gelled by the contact with the dehydration solvent, and further the gel in a variety of forms are obtainable by controlling the manner and conditions in which the gel is put into contact with.

Further according to the invention, zirconia is readily obtained by calcining the gel at relatively low temperatures. The zirconia ranges from a very pure zirconia to zirconia stabilized in a varied degree by calcining the gel which contains the metal species. That is, the process of the invention first makes it possible to produce zirconia which is either very pure or stabilized in varied degrees by simple and inexpensive processes.

Moreover, when the gel of the invention includes boric acid, the gel in the forms of sheets or fibers yields zirconia also in the forms of sheets or fibers by calcination since boric acid functions as binders during the calcination.

EXAMPLES

The present invention will be more easily understood with reference to the following examples, which however are intended to illustrate the invention only and are not to be construed as limiting the scope of the invention.

A. Production of Acidic Boratozirconium Chloride Sols

EXAMPLE A-1

An amount of 100 g of zirconyl carbonate dihydrate ($ZrOCO_3 \cdot 2H_2O$) and 18 g of boric acid ($H_3BO_3$) were mixed with a mixer, and 45 g of 36% hydrochloric acid was added to the mixture under stirring, to provide a paste substance. When the paste substance was heated at 70°-80° C., portions of water evaporated to provide a solid reaction product. After the solid product was crushed, water was added thereto to a total weight of 500 g, and was heated at 70°-80° C. while stirring, so that the solid was dissolved in water, to provide a substantially transparent and viscous boratozirconium chloride sols of pH of 1.4-1.5.

By atomic absorption spectroscopy the sol was found to contain Zr in amounts of 5.3% by weight based on the sol.

EXAMPLE A-2

An amount of 100 g of zirconyl carbonate dihydrate, 250 g of zirconyl chloride ($ZrOCl_2$) and 100 g of boric acid were mixed with a mixer, to provide a paste substance with the generation of heat. After a further heating at 60°-90° C., the paste product became powder. An amount of 5 lit. of water at 70° C. was added to the powder, and was stirred to provide transparent and viscous boratozirconium chloride sols of pH of 1.2.

By atomic absorption spectoscopy the sol was found to contain Zr in amounts of 5.62% and B in amounts of 0.435%.

The sol was gelled in a manner as described hereinafter and dried. By elemental analysis the sol was found to have the compositions corresponding to $ZrOH(HBO_3)_{0.51}(O \text{ or } (OH)_2)_{0.2}Cl \cdot nH_2O$.

EXAMPLE A-3

An amount of 100 g of zirconium hydroxide, 18 g of zirconyl chloride and 17 g of boric acid were mixed uniformly in a mortar to provide a slightly wet mixture of powders. An amount of 20 ml of water was added to the mixture, lightly stirred and heated to provide a porous solid mass. The solid mass was ground in a mortar, and water of 80° C. was added thereto to a total weight of 500 g. The resultant mixture was heated at 80° C. for 2 hours with stirring, to provide transparent viscous boratozirconium chloride sols of pH of 2.1.

By atomic absorption spectroscopy the sol was found to contain Zr in amounts of 5.4%, B in amounts of 0.6% and Cl in amounts of 0.81%.

B. Production of Acidic Boratozirconium Chloride Sols Containing Metals Other than Boron

EXAMPLE B-1

In a 500 ml capacity polyethylene beaker were placed 100 g of zirconyl carbonate dihydrate and 16.2 g of boric acid, and were mixed lightly.

An amount of 25.4 g of yttrium oxide ($Y_2O_3$) was dissolved in hydrochloric acid to a volume of 100 ml. An amount of 6.8 ml of the resultant solution was mixed with 38.1 ml of conc. hydrochloric acid, and the resultant solution was at once added to the above mixture of zirconyl chloride and boric acid.

After stirring the mixture was heated in a water bath of 80°–85° C. to provide solids which was found to contain Y in amounts of 5 mole% of Zr.

Water was added to the solid to a total weight of 500 g and was again heated at 80°–85° C. in a water bath while stirring to dissolve the solid in water. Thereafter the reaction mixture was cooled with water and water was added again to a total weight of 500 g, to provide transparent and viscous acidic boratozirconium chloride sols containing Y.

EXAMPLE B-2

An amount of 100 g of zirconyl carbonate dihydrate and 16.2 g of boric acid were mixed with a mixer.

An amount of 1.06 g of yttrium oxide was dissolved in 38.1 ml of 36% hydrochloric acid under heating, and the resultant solution was added to the above mixture of zirconyl chloride and boric acid, to provide a paste substance. The paste substance was reacted at 70°–80° C. with evaporation of portions of water to provide solids. After crushing the solid, water was added to the solid to a total weight of 500 g, followed by heating at 70°–80° C. for about 1 hour so that the solid was dissolved in water to provide transparent and viscous acidic boratozirconium chloride sols containing Y which had a pH of 1.4–1.5.

By atomic absorption spectroscopy the sol was found to contain Zr in amounts of 5.3% and Y in amounts of 0.17%.

EXAMPLE B-3

An amount of 100 g of zirconyl carbonate dihydrate and 17.4 g of boric acid were mixed with a mixer.

An amount of 1.3 g of antimony oxide ($Sb_2O_3$) was dissolved in 38.1 ml of 36% hydrochloric acid under heating, and the resultant solution was added to the above mixture of zirconyl carbonate and boric acid, to provide a paste. The paste was reacted at 70°–80° C. with evaporation of portions of water to provide solids. After crushing the solid, water was added to the solid to a total weight of 500 g, followed by heating at 70°–80° C. with stirring to dissolve the solid in water to provide transparent and viscous acidic boratozirconium chloride sols containing Sb and having a pH of 1.4–1.5.

By atomic absorption spectroscopy the sol was found to contain Zr in amounts of 5.3% and Sb in amounts of 0.22%.

EXAMPLE B-4

An amount of 100 g of zirconyl carbonate dihydrate and 17.4 g of boric acid were mixed with a mixer.

An amount of 2 g of stannous chloride ($SnCl_2.2H_2O$) was dissolved in 38.1 ml of 36% hydrochloric acid under heating, and the resultant solution was added to the above mixture of zirconyl carbonate and boric acid, to provide a paste. The paste was reacted at 70°–80° C. with evaporation of portions of water to provide solids. After crushing the solid, water was added to the solid to a total weight of 500 g, followed by heating at 70°–80° C. with stirring to dissolve the solid in water to provide transparent and viscous acidic boratozirconium chloride sols in 20% concentration which contained Sn and had a pH of 1.4–1.5.

By atomic absorption spectroscopy the sol was found to contain Zr in amounts of 5.3% and Sn in amounts of 0.25%.

EXAMPLE B-5

In a 500 ml capacity polyethylene beaker were placed 100 g of zirconyl carbonate dihydrate, 16.2 g of boric acid and 3.92 g of tellurium tetrachloride ($TeCl_4$), and were uniformly mixed together. The mixture was then reacted at 80°–85° C. to provide an almost solid reaction product. Water was added to the solid to a total weight of 500 g and was again heated at 80°–85° C. in a water bath with stirring to dissolve the solid in water. Thereafter the reaction mixture was cooled in water to provide transparent and viscous acidic boratozirconium chloride sols containing Te.

An amount of 10 ml of the sol was poured into 100 ml of isopropanol to provide gels. After drying, the gel was found to have the formula nearly corresponding to $ZrOH[(HBO_3)_{0.95}(TeO_3)_{0.05}]Cl.3.5H_2O$ by atomic absorption spectroscopy.

EXAMPLE B-6

An amount of 3.2 g of indium trichloride ($InCl_3$) was dissolved in 20 ml of water, and to the resultant solution was added 37.8 g of conc. hydrochloric acid. The resultant aqueous solution of indium trichloride was mixed together with 100 g of zirconyl carbonate dihydrate and 16.2 g of boric acid in a 500 ml capacity polyethylene beaker to provide a paste. The paste was heated in a water bath of 80° C. for 15 minutes to provide a caramel-like solid product. Water was added to the product to a total weight of 500 g, followed by heating again at 70°–80° C. with stirring to dissolve the solid in water to provide transparent and viscous acidic boratozirconium chloride sols containing In.

By atomic absorption spectoscopy the sol was found to have the formula of $ZrOH[(HBO_3)_{0.95}(InO_2), (OH)_2)_{0.05}]Cl.3.7H_2O$.

EXAMPLE B-7

An amount of 380 ml of 36% hydrochloric acid was added gradually with stirring to 1 kg of zirconyl carbonate ($ZrOCO_3$, containing Zr in amounts of 41% by weight in terms of $ZrO_2$) to dissolve zirconyl carbonate with vigorous foaming and provide a transparent solution. An amount of 32.9 g of indium trichloride hexahydrate ($InCl_3.6H_2O$) and 36.8 g of magnesium chloride hexahydrate ($MgCl_2.6H_2O$) were then dissolved in the hydrochloric acid solution of zirconyl carbonate with effective stirring.

An amount of 205.8 g of boric acid ($H_3BO_3$) was added in small portions to the above solution and was dissolved therein. After about 2 hours heating at 70°–80° C., the mixture became slightly wet solids. Distilled water was added to the solid to a total weight of 8.6 kg, and was stirred, to provide transparent and viscous sols of pH of 1.0.

By chemical analysis the sol was found to contain Zr in amounts of 3.5% and the Zr/Y/Mg molar ratio was found 92/3/5, and Zr/B molar ration 1/1.

C. Production of Basic Boratozirconium Sols

EXAMPLE C-1

The whole volume of the acidic boratozirconium chloride sol obtained in Example A-1 was placed in a 1 lit. capacity glass beaker, and 260 g of ammonium carbonate powder were gradually added to the sol while stirring with a glass rod, and then kneaded together. During the kneading, the sol first gelled and hardened, however, thereafter the gel became a soft and white paste.

The paste was heated at 70°–80° C. so that is gradually changed to a transparent nonviscous boratozirconium ammonium carbonate chloride sol which had a pH of 10.3–10.5. By atomic absorption spectroscopy, the sol was found to contain Zr in amounts of 3.5%.

EXAMPLE C-2

An amount of 500 g of the acific boratozirconium chloride sol containing Y obtained in Example B-1 was placed in a polyethylene beaker, and 260 g of ammonium carbonate powder were gradually added to the sol while stirring, and then kneaded together. The resultant mixture was heated in water bath of 80°–85° C. while stirring to provide a transparent solution, and then cooled in water. Water was then added to the mixture to a total weight of 760 g to provide 620 ml of boratozirconium ammonium carbonate sols which had a pH of 9.35.

EXAMPLE C-3

An amount of 800 g of ammonium hydrogen carbonate was added to 1 kg of zirconyl carbonate ($ZrOCO_3$, containing Zr in amounts of 41% by weight in terms of $ZrO_2$), and the mixture was stirred for 20 min. to provide a white paste. The paste was then heated in a water bath of 60°–62° C. for 2 hours, to provide a transparent sol. After cooling, distilled water was added to the sol to a total weight of 3.04 kg. The resultant zirconium ammonium sol was found to contain Zr in amounts of 10% by weight, and have a pH of 9.0.

EXAMPLE C-4

An amount of 800 g of ammonium hydrogen carbonate was added to 1 kg of zirconyl carbonate ($ZrOCO_3$, containing Zr in amounts of 41% by weight in terms of $ZrO_2$), and the mixture was stirred for 20 min. to provide a white paste. The paste was then heated in a water bath of 60°–65° C. for 2 hours, to provide a transparent zirconium ammonium carbonate sol. After cooling, 205.8 g of boric acid ($H_3BO_3$) was added to the sol to dissolve in the sol with effective stirring, and then distilled water was added to the sol to a total weight of 3.04 kg. The resultant sol was found to contain Zr in amounts of 10% by weight by chemical analysis.

D. Gellation of Acidic Boratozirconium Chloride Sols

EXAMPLE D-1

An amount of 130 ml of the acidic boratozirconium chloride sol obtained in Example A-1 was added at a rate of 20 ml/min. to acetone stirred in a mixer, to provide finely divided white powders. After aging the resultant gel by a further stirring for about 3 min., the gel was filtered with No. 3C filter paper, dried in a thermostat at 40° C. for 10 min., to provide finely divided powders of acidic boratozirconium chloride gels.

An amount of 1 g of the gel powder was added to water, and the gel was found to gradually dissolve in water to provide the same acidic boratozirconium chloride sol as before.

By atomic absorption spectroscopy the gel was found to contain 34.2% of Zr, 4.01% of B, 13.1% of Cl, 0.11% of Fe, 0.01% of Na and 0.21% of Si. The gel was also found to contain water in amounts of 24.1% by weight based on the gel through the weight decrease when being heated at 150° C., and amorphous by X-ray powder diffraction.

The calcination of the gel at 900° C. in a crucible yielded zirconia powders of not more than about 10 μm in diameter.

EXAMPLE D-2

An amount of 200 ml of the acidic boratozirconium chloride sol obtained in Example A-1 was added gradually to a mixture of 1.5 lit. of acetone and 30 ml of ammonia water in a 2 lit. capacity glass beaker while gently stirring with a magnetic stirrer, to provide finely divided white powders. After ageing the resultant gels by a further stirring for about 20 min., the gel was filtered with No. 3C filter paper, washed with 20 ml of acetone and vacuum dried at room temperatures, to provide 58.5 g of very fine powders of acidic boratozirconium chloride gels.

By atomic absorption spectroscopy the gel was found to contain 32.1% of Zr, 3.6% of B, and 12.8% of Cl. The gel was also found to contain hydrated water in amounts of 27.7% through the weight decrease by heating at 250° C. The gel was found to contain in addition to the above elements 0.01% of Fe, 0.01% of Al, 0.02% of Si and 0.005% of Na. Accordingly the gel was found not to be contaminated with the impurities contained in the sol, so that the sol, was purified by the gellation to provide gels with a higher purity.

The calcination of the gel at 1200° C. in a crucible for 2 hours yielded finely divided monoclinic zirconia powders which had a narrow grain size distribution, i.e., about 85% of the powder had particle sizes of 0.5–0.1 μm.

EXAMPLE D-3

An amount of 300 ml of acetone were placed in a first 500 ml capacity glass beaker, and a mixture of 300 ml of acetone and 3 ml of ammonia water were placed in the same beaker as above.

The acidic boratozirconium chloride sol obtained in Example B-1 containing Y was extruded into the first beaker with an injector to provide sols in the form of continuous filament or thread. Then the sol was guided to the second beaker, immersed therein, aged and taken out therefrom into the air, and wound upon a bobbin with drying. The resultant thread-like gel was elastic and water-soluble, and of about 0.5 μm in diameter and of 40 m in length.

The thread-like gel was removed from the bobbin by making use of the elasticity of the gel, and the coil of the thread-like gel was dried as it was in an drying oven, to provide a coil having a reduced diameter, about two thirds of the diameter before the drying. The thread-like gel was still found to possess elasticity and was capable of being again wound upon a bobbin.

Further the calcination of the thread-like gel at 1200° C. yielded partially stabilized zirconia which still had a thread-like form although the elasticity was somewhat lost.

EXAMPLE D-4

An amount of 40 ml of the acidic boratozirconium chloride sol containing Y obtained in Example B-1 was extruded at a rate of 5 ml/min. with an injector into 300 ml of acetone stirred with a synthetic resin rod in a 500 ml capacity beaker, to provide sols in the form of fiber of about 0.1 mm in diameter and of 1.5–3.5 cm in length. The gel was stabilized by ageing for about 5 min.

A portion of 100 ml of the contents in the beaker was taken out, filtered with a No. 5C filter paper, to provide acidic boratozirconium chloride gels in the form of sheet of about 0.2 mm in thickness.

Another portion of 100 ml of the contents in the beaker was taken out, and 0.5 ml of ammonia water was added dropwise thereto, followed by two minutes ageing. Then the mixture was filtered with a No. 3C filter paper and dried, to provide acidic boratozirconium chloride xerogels containing Y in the form of short fibers.

EXAMPLE D-5

An amount of 1.75 g of magnesium chloride was dissolved in 1 lit. of isopropanol in a 2 lit. capacity glass beaker. An amount of 250 g of the acidic boratozirconium chloride sol which contained 5 mole% of Y as obtained in Example B-1 was extruded into the isopropanol solution with an injector with stirring to provide white fibrous gels. After ageing for 2 min. under stirring, the gel was filtered out as a elastic sheet. Substantially no Mg, Y and Cl were detected in the filtrate, however, a trace of B was detected.

The calcination of the gel sheet at 1600° for about 1 hour yielded partially stabilized zirconia in the form of sheet.

EXAMPLE D-6

An amount of 50 g of the acidic boratozirconium chloride sol obtained in Example A-1 was placed in a 200 ml capacity glass beaker. An amount of 40 ml of ethanol was gradually added to the sol with stirring, and the mixture was left standing, to provide transparent and colorless pudding-like hydrogels.

The hydrogel was added to 200 ml of ethyl acetate in a 500 ml capacity glass beaker with vigorous stirring, then immediately the hydrogel changed to zerogels by dealcohol and precipitated as white fine powders. The powder was filtered and dried to provide white fine powers of gels.

By atomic absorption spectroscopy the gel was found amorphous, and the infrared spectrum of the gel was consistent with that described in U.S. Patent No. 3,423,193. An amount of 20 g of the gel was added to 100 ml of water and stirred to provide sols.

E. Gellation of Basic Boratozirconium Sols

EXAMPLE E-1

An amount of 400 ml of 99% methanol were placed in a 500 ml capacity beaker. To this methanol under stirring were added 100 ml of the basic boratozirconium ammonium carbonate sol obtained in Example B-1 over about 5 min., to provide white boratozirconium ammonium carbonate gels. After a further stirring for ageing, solids were separated by filtration, and the supernatant was decanted. The solid was dried at 25° C. to leave fine powders. By X-ray diffraction the gel was found amorphous, and by atomic absorption spectroscopy the gel was found to contain 24% of Zr, 1.5% of B, 0.1% of Cl, 0.1% of Fe, 0.05% of Al and 0.3% of Si.

An amount of 2 g of the fine powder of the gel was added to 20 ml of distilled water to provide a transparent and relatively low viscous basic sol.

EXAMPLE E-2

The acidic boratozirconium chloride sol containing Y therein as obtained in Example B-2 was converted to basic boratozirconium ammonium carbonate gel in the same manner as in Example C-1. An amount of 200 ml of the sol solution was mixed with a vigorous stirring with 800 ml of 99% methanol with a mixer to provide fine precipitates. The precipitate was filtered with a No. 3C filter paper and dried at 25° C. to provide white fine powers of the gel.

By atomic absorption spectroscopy the gel was found amorphous and to have the formula of $(NH_4)_{2.02}ZrO[(HYO_3)_{0.03}(HBO_3)_{0.5}](CO_3)_{1.47}Cl_{0.02}.nH_2O$.

An amount of 2 g of the fine powder of the gel was added to 20 ml of distilled water to return to transparent and relatively low viscous basic sols.

The calcination of the fine powder gel in a crucible at 1200° C. and was then left standing to room temperature to yield zirconia fine powders. The X-ray diffraction showed that the zirconia was mainly composed of tetragonal form.

EXAMPLE E-3

An amount of 10 g of magnesium chloride hexahydrate was dissolved in 400 ml of methanol in a 500 ml capacity beaker. Under stirring with a glass rod at a rate of about 180 rpm, 100 ml of basic boratozirconium carbonate sol solution containing Y therein as obtained in Example C-2 was added dropwise at a rate of 20 ml/min. to the methanol solution of magnesium chloride, to provide fine powders of gels. After stirring for ageing for about 3 min., the gel was filtered with a No. 3C filter paper with suction. The gel was then washed in 50 ml of methanol, filtered and dried in vacuuo to provide white and fine powders of the gel.

The gel powder was calcined in a crucible at 1000° C. for 2 hours, and was then left standing to room temperatures to provide fine powders of the gel. The zirconia was found stabilized zirconia having the tetragonal form by X-ray diffraction study, and also found to contain small amounts of Mg.

By atomic absorption spectroscopy the gel was found to contain 65% of Zr, 4.5% of Y, 1.2% of Mg, 0.01% of Fe, 1.1% of B, 0.01% of Al and 0.03% of Si.

The zirconia powder was found to be composed of 5% of powder of 1–0.7 $\mu$m, 85% of powder of 0.7–0.3 $\mu$m and not more than 10% of powder of 0.3 $\mu$m.

EXAMPLE E-4

An amount of 1 lit. of isopropanol was placed in a 2 lit. capacity glass beaker and then 10 ml of ammonia water. An amount of 250 ml of acidic boratozirconium chloride sol solution containing Y in amounts of 5 mole% therein as obtained in Example B-1 was mixed with the isopropanol solution with a mixer, to provide fine powders of gels, which were then filtered with suction, to provide fine powders of gel.

F. Production of Zirconia by Calcination of Gels

EXAMPLE F-1

An amount of about 0.5 g of fine powders of acidic boratozirconium chloride gels as obtained in Examples D-1 was heated at 600° C., 700° C., 800° C. and 900° C., respectively, in a crucible, and then was left standing to room temperatures. In the same manner as above, about 0.5 g of each acidic boratozirconium chloride gels as obtained in Example D-2, the thread-like gel containing Y as obtained in Example D-3, and the gel containing Y in the form of short fibers and sheets as obtained in Example D-4 were respectively heated at 600° C., 700° C., 800° C. and 900° C., in a crucible, and then was left standing to room temperatures.

Each gel used was found to retain the original shape after the calcination at either temperatures since boric acid ($B_2O_3$) in the gel functioned as a binder during the calcination to make it possible for the gel to be unchanged in the shape during the calcination.

However, in the calcination of powder gels, there took place no coagulation of powders due to molten $B_2O_3$ since $B_2O_3$ rapidly evaporates from the gel. Therefore, the particle size of the zirconia obtained by the calcination of the gel powder of Example D-1 was found to be not more than about 1 $\mu$m. The particle size of the zirconia obtained by the calcination of the gel powder of Example D-2 was found to be not more than about 4 $\mu$m. As a further result, the zirconia obtained by the calcination of the gel powder of Example D-1 was found to be 99% in purity and was found to contain boron in amounts of about 20 ppm.

The mixed powder or coprecipitate as described hereinbefore produces monoclinic zirconia at about 600° C. when being calcined. However, since the gel according to the invention contains boron therein, the gel produces tetragonal zirconia when being calcined at about 600° C., as illustrated in FIG. 3. When being calcined at 800°-900° C., the tetragonal structure decreases while the monoclinic structure appears to yield partially stabilized zirconia. When the gel containing Y therein is calcined at 1200° C., the gel yields substantially the same zirconia as that obtained by the calcination at 800° C. as illustrated by X-ray diffraction study. Therefore, according to the invention, partially stabilized zirconia is obtainable by calcining at relatively low temperatures the gel which contains boron therein.

EXAMPLE F-2

The basic boratozirconium gel containing yttrium therein as obtained in Examples E-3 was calcined at 1200° C., to provide zirconia. The X-ray diffraction diagram is shown in FIG. 4. The zirconia was found to tetragonal, and the diagram was substantially the same as the diagram of the zirconia obtained by the calcination of the gel at 1000° C. in Example E-3. The zirconia was found to contain small amounts of magnesium oxide.

The zirconia powder was found to be composed of 4.5% of powder of 1-0.7 $\mu$m, 37% of powder of 0.7-4.5 $\mu$m, 48% of powder of 0.5-0.3 $\mu$m and 10.5% of powder of not less than 0.3 $\mu$m.

G. Gellation of Zirconium Ammonium Carbonate Sol

Example G-1

An amount of 3.29 g of yttrium trioxide hexahydrate and 3.68 g of magnesium chloride hexahydrate were dissolved in 300 ml of 99% methanol. To the resulant solution was gradually added 250 ml of zirconium ammonium carbonate sol on the market (containing Zr in amounts of 13.1% in terms of $ZrO_2$) to provide white and fine powders of gels. After a 20 min. ageing under stirring, the gel powder was filtered out with No. 3C filter paper and dried.

By atomic absorption spectroscopy the fine powder gel was found to contain 41.5% of Zr, 1.3% of Y and 0.6% of Mg. The gel was further found amorphous by X-ray diffraction.

The gel was gradually heated to a temperature of 1200° C. over 6-7 hours and calcined at the temperature, to provide partially stabilized zirconia powders which had a small range distribution of particles, and average particle size of about 0.3 $\mu$m.

EXAMPLE G-2

An amount of 18.5 g of boric acid ($H_3BO_3$), 3.29 g of yttrium trioxide hexahydrate and 3.68 g of magnesium chloride hexahydrate were dissolved in 300 ml of 99% methanol. To the resultant solution was gradually added 250 ml of the same zirconium ammonium carbonate sol as used in Example G-1 to provide white and fine powders of gels. After a 20 min. ageing under stirring, the gel powder was filtered out with No. 3C filter paper and dried.

By atomic absorption spectroscopy the fine powder gel was found to contain 42.9% of Zr, 4.6% of B, 1.4% of Y and 0.6% of Mg. The gel was further found amorphous by X-ray diffraction study.

The calcination of the gel in the same manner as in Example G-1 yielded partially stabilized zirconia powders which had a small range distribution of particles, and average particle size of about 0.3 $\mu$m.

EXAMPLE G-3

An amount of 100 g of zirconyl carbonate dihydrate ($ZrOCO_3.2H_2O$, containing Zr in amounts of 41% by weight in terms of $ZrO_2$) and 80 g of ammonium hydrogen carbonate were mixed together with a mixer to provide a white paste. The paste was then heated at 60°-70° C. to provide a transparent zirconium ammonium carbonate sol of a pH of 10.2-10.3. To the whole of the sol were added boric acid ($H_3BO_3$) and the mixture was reacted with stirring to provide about 100 ml of a boratozirconium ammonium carbonate sol solution.

An amount of 3.29 g of yttrium trichloride hexahydrate and 3.68 g of magnesium chloride hexahydrate were placed in a 500 ml capacity glass beaker and were added thereto 300 ml of 99% methanol to dissolve the chlorides therein. To this methanol solution was added the sol solution with stirring to provide finely divided powders of gels. After stirring for about 5 min. for ageing until the gel was stabilized, the gel powder was filtered out and dried to provide white and fine powders of gel.

The filtrate was found to contain substantially no Zr nor Y, however, a trace amount of B, by atomic absorption spectroscopy.

An amount of 1 g of the gel was dissolved in 20 ml of distilled water. The gel was found to return to a slightly viscous sol solution.

The calcination of the gel at 1600° C. for about 2 hours yielded fine powders of zirconia. By X-ray diffraction study the zirconia was found partially stable zirconia which was composed of tetragonal forms partially accompanied by monoclinic forms. The zirconia was also found to have a narrow particle size distribution, i.e., the particle size ranged between 0.5–1 μm.

EXAMPLE G-4

An amount of 100 g of zirconyl carbonate dihydrate was mixed together with 77 g of ammonium hydrogen carbonate with a mixer to provide a white paste. The paste was then heated at 60°–70° C. to provide a transparent zirconium ammonium carbonate sol of a pH of 10.2–10.3 after vigorous foaming. To the whole of the sol were added 19.7 g of ammonium borate tetrahydrate, and the mixture was reacted with stirring to provide about 100 ml of a boratozirconium ammonium carbonate sol solution.

An amount of 3.29 g of yttrium trichloride hexahydrate and 3.68 g of magnesium chloride hexahydrate were placed in a 500 ml capacity glass beaker and were added thereto 300 ml of 99% methanol to dissolve the chlorides therein. To this methanol solution was added the sol solution with stirring to provide finely divided powders of gels. After stirring for about 5 min. for ageing until the gel was stabilized, the gel powder was filtered out and dried to provide white and fine powders of gel.

The filtrate was found to contain substantially no Zr nor Y, however, a trace amount of B by atomic absorption spectroscopy.

An amount of 1 g of the gel was found to dissolve in 20 ml of distilled water and returned to a slightly viscous sol solution.

The calcination of the gel at 1600° C. for about 2 hours yielded fine powders of zirconia. By X-ray diffraction study the zirconia was found partially stable zirconia which was composed of tetragonal forms partially accompanied by monoclinic forms. The zirconia was also found to have a narrow particle size distribution, i.e., the particle size ranged between 0.5–1 μm.

EXAMPLE G-5

An amount of 5 kg of zirconyl carbonate dihydrate was mixed togther with 4 kg of ammonium hydrogen carbonate with a mixer to provide a white paste in about 30 min. The paste was put into a polyethylene pouch, and was heated in a water bath maintained at 60°–65° C. with occasional stirring so that the paste became a transparent zirconium ammonium carbonate sol solution. The volume was found 5.1 lit.

An amount of 165 g of yttrium trichloride hexahydrate and 100 g of anhydrous calcium chloride were dissolved in about 15.3 lit. of 99.5% methanol in a about 40 lit. capacity stainless steel vessel. The above sol solution was then added to the methanol solution under stirring, to provide white precipitates. After ageing for about 30 min., the precipitate was filtered out with a No. 5C filter paper under suction, and dried at about 115° C., to provide white and fine powders of zirconium ammonium carbonate gel. The gel was found amorphous by powder X-ray diffraction.

The calcination of the gel at 1200° C. yielded fine powders of zirconia. By X-ray diffraction study, the zirconia was found partially stable zirconia which was composed of monoclinic and tetragonal forms. The zirconia was also found to contain 70.1% of Zr, 2.3% of Y and 1.8% of Ca.

EXAMPLE G-6

An amount of 500 g of zirconyl carbonate dihydrate was mixed together with 400 g of ammonium hydrogen carbonate in a 2 lit. capacity polyethylene beaker, and was then heated in a water bath maintained at 60°–65° C. with stirring, to provide a paste. After a further stirring and heating, vigorous foaming took place, and thereafter the mixture became a transparent and slightly viscous zirconium ammonium carbonate sol solution. The total heating time from the beginnning to this stage was about 2 hours. The sol solution was found to have a volume of 490 ml.

An amount of 22.3 g of aluminum chloride hexahydrate and 18.8 g of magnesium chloride hexahydrate were dissolved in about 1.5 lit. of 99.5% methanol in a 3 lit. enameled vessel. The 490 ml of the above sol solution was then added to the methanol solution under stirring, to provide white precipitates. After ageing for about 1 hour, the precipitate was filtered out with a centrifugal filtrator, air-dried, and calcined at about 800° C., to provide zirconia powders. Meanwhile, substantially neither Zr, Al nor Mg were detected in the filtrate by chemical analysis.

By X-ray diffraction study, the zirconia powder was found partially stable zirconia which was composed of monoclinic and tetragonal forms.

H. Production of Sintered Molds

EXAMPLE H-1

The following zirconias were sintered to molds:

(a) partially stabilized zirconia powders containing Y and Mg as obtained in Example E-3 by adding dropwise the basic boratozirconium carbonate sol to a methanol solution of magnesium chloride to provide gel powders, drying and then calcining at about 1000° C. for 2 hours;

(b) partially stabilized zirconia powders obtained by adding the acidic boratozirconium chloride sol contaning Y therein to acetone to provide gel powders, drying and the calcining at about 800° C. for 2 hours;

(c) partially stabilized zirconia powders available on the market (PSZ-3Y by Toyo Soda K.K., Japan).

Each zirconia powder was mized with water to form a 65% by weight slurry, and a small amount of polyacrylamide was added to the slurry to provide a fluidizable slurry of a low viscosity suitable for casting molding. The slurry was poured into a plaster mold having a cylindrical cavity of 2 cm in diameter and 10 cm in depth, and after 30 min. the mold was taken out of the mold. The green mold was cut to three small cylindrical pieces each of 2 cm in diameter and 2 cm in length, and then dried for 2 days at room temperatures.

The thus obtained five samples of cylindrical green molds were placed on an aluminum plate and then put in a heating furnace. All the green molds were heated at a rate of 10°–15° C./min. to about 800° C., and then sintered at the temperature for 2 hours, then one of the samples was taken out of the furnace. Thereafter, the other samples were further sintered at 1000° C., 1100° C., 1300° C. and 1600° C., respectively, for 1 hour, and were cooled, to provide molds sintered at varied temperatures.

The crystallographic form of the mold was studied by the powder X-ray diffraction method but also the sintered degree of the mold was evaluated by immersing the mold in water at room temperatures. The contraction of the mold was also determined. The results are shown in Table.

The zirconia (a) and (b) of the invention contain boric acid therein so that they were found to be sinterable at temperatures as low as about 800° C. On the contrary, the zirconia (c) contains only Y therein, and the sintering was found to begin at 1100°–1200° C. and densely sintered at 1400°–1600° C.

EXAMPLE H-2

An amount of 70 g of hydroxyapatite (by Sigma Chemical Co.) was mixed with 30 g of the same zirconia powder (a) as used in Example H-1, and the mixture was ball-milled for 24 hours. Water was then added to the mixture to form a slurry, and the slurry was formed into a green mold in the same manner as in Example H-1, and dried. The green mold was placed in a rubber pouch, and a hydrostatic pressure of 100 kg/cm$^2$ was applied to the pouch in water for 10 min.

The resultant pressed mold was cut to three pieces of samples. The three samples were sintered at 1200° C., 1300° C. and 1400° C., respectively, to provide sintered molds which had bending strengths of 215 MPa, 200 MPa and 190 MPa, respectively.

TABLE

| Sintered Temperatures | | Zirconias | | |
|---|---|---|---|---|
| | | (a) | (b) | (b) |
| 800° C. | Forms[1] | C (T), PSZ | C (T), PSZ | PSZ |
| | Sintered degrees | Not disintegrated in water | Not disintegrated in water | Disintegrated in water |
| | Contractions (%) | 5.4 | 5.6 | 3.2 |
| 1000° C. | Forms | C (T and M) | C (T and M) | PSZ |
| | Sintered degrees | Not disintegrated in water | Not disintegrated in water | Disintegrated in water |
| | Contractions (%) | 9.2 | 9.3 | 5.2 |
| 1100° C. | Forms | M | M | PSZ |
| | Sintered degrees | Cracked when taken out of a furnace | Cracked when taken out of a furnace | Slightly sintered |
| | Contractions (%) | 10.8 | 11.0 | 6.3 |
| 1300° C. and 1600° C. | Forms | PSZ | PSZ | PSZ |
| | Sintered degrees | Densely sintered | Densely sintered | Densely sintered |
| | Contractions (%) | 13.5–15.4 | 14.1–17.0 | 12.1 |

Notes:
C, T and M mean cubic, tetragonal and monoclinic forms, respectively, and the forms in the parentheses mean the appearance in small amounts. PSZ means partially stabilized zirconia.

In the same manner as above, pressed molds were prepared by the hydrostatic molding by use of a mixture of the same hydroxyapatite as above and the same zirconia powder (c) as used in Example H-1, and the resultant three pieces of samples were sintered at 1200° C., 1300° C. and 1400° C., respectively, under a pressure of 100 kg/cm$^2$ for 10 min. by the hot press method, to provide sintered molds which had bending strengths of 100 MPa, 205 MPa and 195 MPa, respectively.

In comparison with the zirconia powders of the invention, the powder (c) contains no boric acid, and was found not to be fully sintered at 1200° C.

What is claimed is:

1. A process for producing acidic boratozirconium chloride sols which comprises: reacting at least on of zirconyl carbonate, zirconyl sulfate, zirconyl nitrate, zirconyl hydroxide, basic zirconyl chloride, zirconyl carboxylate and zirconyl chloride, with boric acid or borax in a molar ratio of B/Zr of about 0.3–1.2 together with a compound of a metal M, the metal M being selected from the group consisting of divalent, trivalent, tetravalent and pentavalent metals in a molar ratio of M/Zr of about 0.01–1 in water in the presence of chloride ions in a molar ratio of Cl/Zr of not less than about 1.

2. The process as claimed in claim 1, wherein the divalent metal is Mg, Ca, Ba, Sr, Pb, Ni, Cu, Zn or Mn; the trivalent metal is Y, Al, Fe, Ga, In, Bi, Ce or La; the tetravalent metal is Ti, Sn, Si, Ge or Te; and the pentavalent metal is V, Mo, Sb or W.

3. An acidic boratozirconium chloride sol produced by: reacting at least one of zirconyl carbonate, zirconyl sulfate, zirconyl nitrate, zirconyl hydroxide, basic zirconyl chloride, zirconyl carboxylate and zirconyl chloride, with boric acid or borax in a molar ratio of B/Zr of about 0.3–1.2 together with a compound of a metal M, the metal M being selected from the group consisting of divalent, trivalent, tetravalent and pentavalent metals in molar rations of M/Zr of about 0.01–1 in water in the presence of chloride ions in a molar ratio of Cl/Zr of not less than about 1, wherein the divalent metal is Mg, Ca, Ba, Sr, Pb, Ni, Cu, Zn or Mn; the trivalent metal is Y, Al, Fe, Ga, In, Bi, Ce or La; the tetravalent metla is Ti, Sn, Si, Ge or Te; and the pentavalent metal is V, Mo, Sb or W.

* * * * *